United States Patent [19]
Vollmann

[11] Patent Number: 5,309,302
[45] Date of Patent: May 3, 1994

[54] SYSTEM COMPRISING A PLAYER AND/OR RECORDER APPARATUS AND A TAPE CASSETTE, AND THE APPARATUS AND A CASSETTE SUITABLE FOR USE IN SUCH A SYSTEM

[75] Inventor: Norbert C. Vollmann, Eindhoven, Netherlands

[73] Assignee: U.S. Philips Corporation, New York, N.Y.

[21] Appl. No.: 769,599

[22] Filed: Oct. 1, 1991

[30] Foreign Application Priority Data
Dec. 21, 1990 [NL] Netherlands ............... 9002844

[51] Int. Cl.[5] ............................. G11B 5/008
[52] U.S. Cl. ........................ 360/96.1; 360/130.3
[58] Field of Search ............ 360/96.1, 130.3, 130.31, 360/130.32, 130.33, 133; 242/191, 192, 197, 198, 199

[56] References Cited
U.S. PATENT DOCUMENTS
4,646,186 2/1987 Tsuchiya et al. ............ 360/96.1
5,074,486 12/1991 Vollmann ..................... 242/199

Primary Examiner—Edward P. Westin
Assistant Examiner—T. Davenport
Attorney, Agent, or Firm—John C. Fox

[57] ABSTRACT

A system comprises an apparatus (20) and a cassette (1) adapted to cooperate with each other. The apparatus comprises a magnetic-head unit (32) with a magnetic head (38), further tape guides (42, 44) and projections (48, 52). The cassette comprises a magnetic tape (3) and a resilient element (100) with tape guides (101, 102). During cooperation of the apparatus with the cassette the tape guides (101, 102) are situated between the magnetic head (38) and the further tape guides (42, 44), and the tape guides (101, 102) are in contact with the projections (48, 52). This provides an additional guidance for the magnetic tape at the location of the magnetic-head unit, which improves the contact between the magnetic tape (3) and the magnetic head (38) and the further tape guides (42, 44).

5 Claims, 4 Drawing Sheets

SYSTEM COMPRISING A PLAYER AND/OR RECORDER APPARATUS AND A TAPE CASSETTE, AND THE APPARATUS AND A CASSETTE SUITABLE FOR USE IN SUCH A SYSTEM

BACKGROUND OF THE INVENTION

The invention relates to a system comprising a player and/or recorder apparatus and a tape cassette suitable for cooperation with the apparatus, which cassette comprises a magnetic tape with a coating on one side, and a housing having two parallel main walls and various transverse walls including one front wall formed with a magnetic-head opening, along which front wall the magnetic tape in the housing extends with its coating side facing the opening, which cassette further comprises a resilient element with two tape guides, which element is situated near the opening at the back of the magnetic tape in the cassette, which tape guides each comprise a guide surface guiding the magnetic tape during cooperation with the apparatus, which apparatus comprises a magnetic-head unit with a head face past which the magnetic tape is moved in its longitudinal direction during cooperation with the cassette, the magnetic tape coating being in contact with the head face.

Such a system is described in U.S. Pat. No. 5,074,486, assigned to the present assignee. During cooperation of the apparatus with the cassette, the magnetic tape is moved past the magnetic-head unit and over the head face in order to read and/or write information from/on the magnetic tape. In magnetic recording it is essential that when signals are read from a magnetic tape, the transducing gap of the magnetic-head unit is disposed at the same angle (azimuth angle) relative to the magnetic tape as during recording of these signals. In order to ensure that in operation the magnetic tape is always moved over the head face at the same angle, further tape guides have been provided in the apparatus at opposite sides of the head face in the direction of transport. These further tape guides comprise height limiters, which ensure that the magnetic tape always occupies the same position relative to the head face. The further tape guides further comprise control means to keep the magnetic tape in contact with the height limiters. For a comprehensive description of the further tape guides with the height limiters and the control means, reference is made to U.S. Pat. No. 4,485,420 and U.S. Pat. No. 4,926,278 (herewith incorporated by reference).

In the described system the tape guides in the cassette have projections which during cooperation with the apparatus are in contact with the magnetic-head unit and keep the tape guides spaced from the magnetic-head unit to prevent the magnetic tape from becoming stuck between the tape guides and the head face. The presence of said projections complicates the construction of the resilient element with the tape guides, which also leads to an increase in the production costs thereof. Since such cassettes are manufactured in large quantities, it is important to keep the construction of the cassette as simple as possible.

OBJECTS AND SUMMARY OF THE INVENTION

The invention has for one of its objects to provide a system of the type defined in the opening paragraph characterized in that, viewed in the longitudinal direction of the magnetic tape, the magnetic-head unit comprises two projections at each side of the head face, which projections, viewed in the width direction of the magnetic tape, are spaced at a distance from one another which is at least equal to the width of the magnetic tape, end portions of the guide surfaces being in contact with the projections during cooperation with the apparatus. Having the projections on the magnetic-head unit enables the tape guides in the cassette to have a guide surface without projections, which simplifies the construction. Since the magnetic head units are manufactured in smaller quantities than the cassettes, making their construction slightly more complicated will present hardly any problem. Moreover, as parts of the magnetic-head unit are moulded integrally, the presence of the projections will not make the production of the magnetic heads more complex and more expensive.

The invention also relates to a cassette suitable for use in the system in accordance with the invention. In a embodiment of the cassette in accordance with the invention, the resilient element comprises two bridge portions interconnecting the tape guides, and two blade springs, each secured to one tape guide. In another embodiment the resilient element is constituted by one sheet member having bent portions. This enables the resilient element with the tape guides to be manufactured as a simple sheet member, so that the production costs of such an element, and hence the production costs of the cassette, are low.

The invention further relates to an apparatus suitable for use in the system in accordance with the invention. An embodiment of the apparatus in accordance with the invention is characterized in that each projection has a flat surface which during cooperation with the cassette is in contact with one of the end portions of one of the guide surfaces of one of the tape guides. Since the tape guides of the cassette are pressed against these flat surfaces during cooperation of the cassette with the apparatus, this prevents the tape guides from slipping off the projections and thereby causing the magnetic tape from being stuck between the tape guides and the magnetic-head unit.

U.S. Pat. No. 4,564,157 describes a system comprising a cassette and an apparatus, in which the cassette comprises tape supports which keep the magnetic tape stretched along the front side of the cassette while the cassette is outside the apparatus and which are disengaged from the magnetic tape by tape guides in the apparatus while the cassette cooperates with the apparatus. These known tape supports somewhat resemble the tape guides used in accordance with the invention but have an entirely different function and, consequently, a different location in the cassette. The tape supports do not guide the magnetic tape and are in contact with the magnetic tape when the cassette is outside the apparatus, which is not the case with the tape guides of the cassette in accordance with the invention.

BRIEF DESCRIPTION OF THE DRAWING

The invention will now be described in more detail, by way of example, with reference to the drawings, which shown an embodiment of the system in accordance with the invention. In the drawings.

DESCRIPTION OF THE PREFERRED EMBODIMENTS

Figure 1:
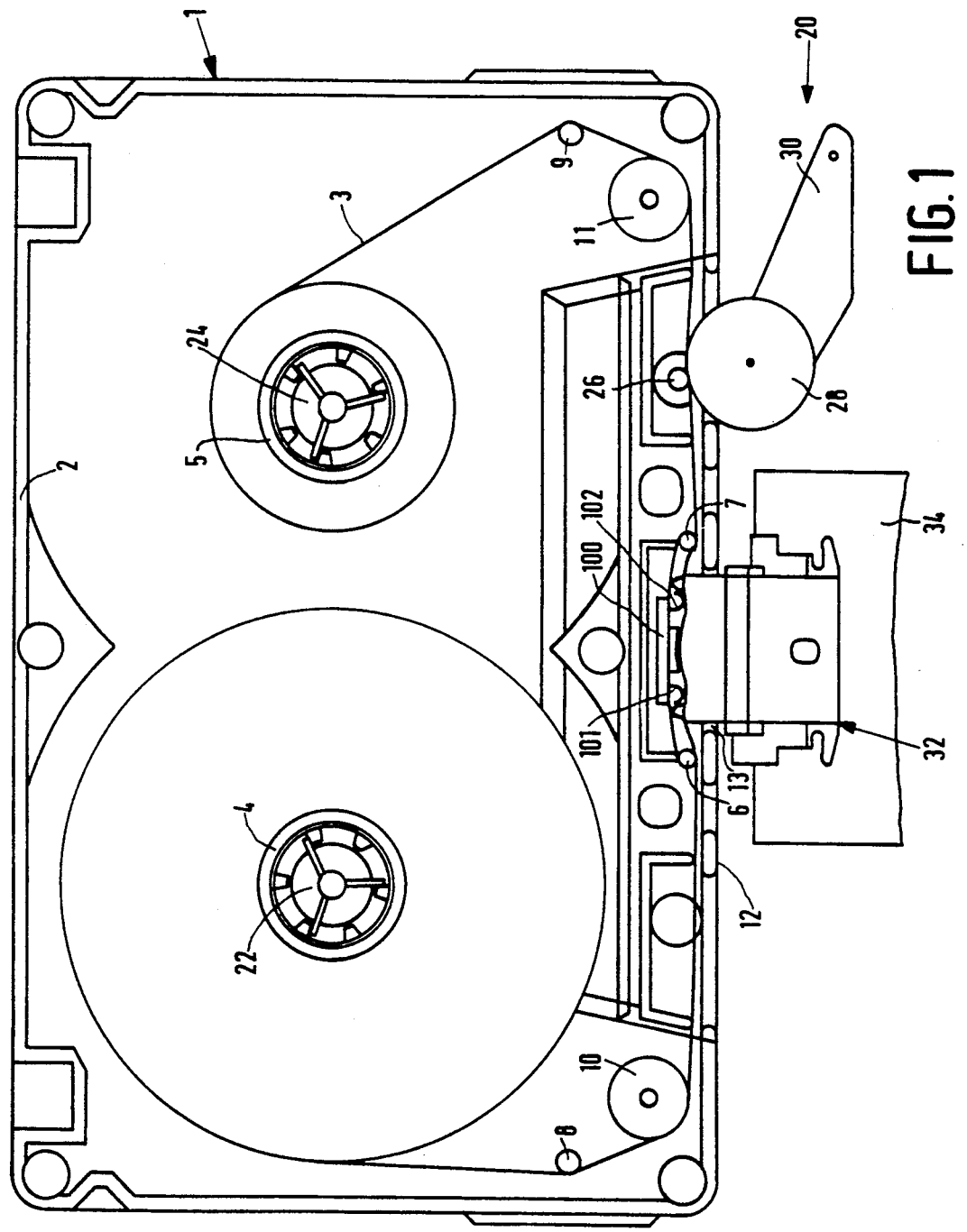
FIG. 1 shows an embodiment of a cassette and parts of an embodiment of an apparatus belonging to the system in accordance with the invention.

FIG. 1 shows a cassette 1 and parts of an apparatus 20 cooperating with the cassette, which belong to an embodiment of the system in accordance with the invention. The cassette comprises a housing 2 which accommodates a magnetic tape 3, which has been wound on reels 4 and 5 and which is guided inside the housing by posts 6, 7, 8, 9 and rollers 10, 11. The reels are driven by drive spindles 22, 24 and the magnetic tape is moved by means of a capstan 26. The magnetic tape is pressed against the capstan by a pressure roller 28 arranged on a movable arm 30. For reading and writing information on the magnetic tape, the apparatus comprises a magnetic-head unit 32, which is arranged on a movable head support 34. During cooperation of the cassette with the apparatus, the magnetic-head unit 32 enters the cassette housing 2 through a magnetic-head opening 13 in a front wall 12. A resilient element 100 in the cassette is provided with two tape guides 101 and 102 for guiding the magnetic tape at the location of the magnetic-head unit 32.

Figure 2:
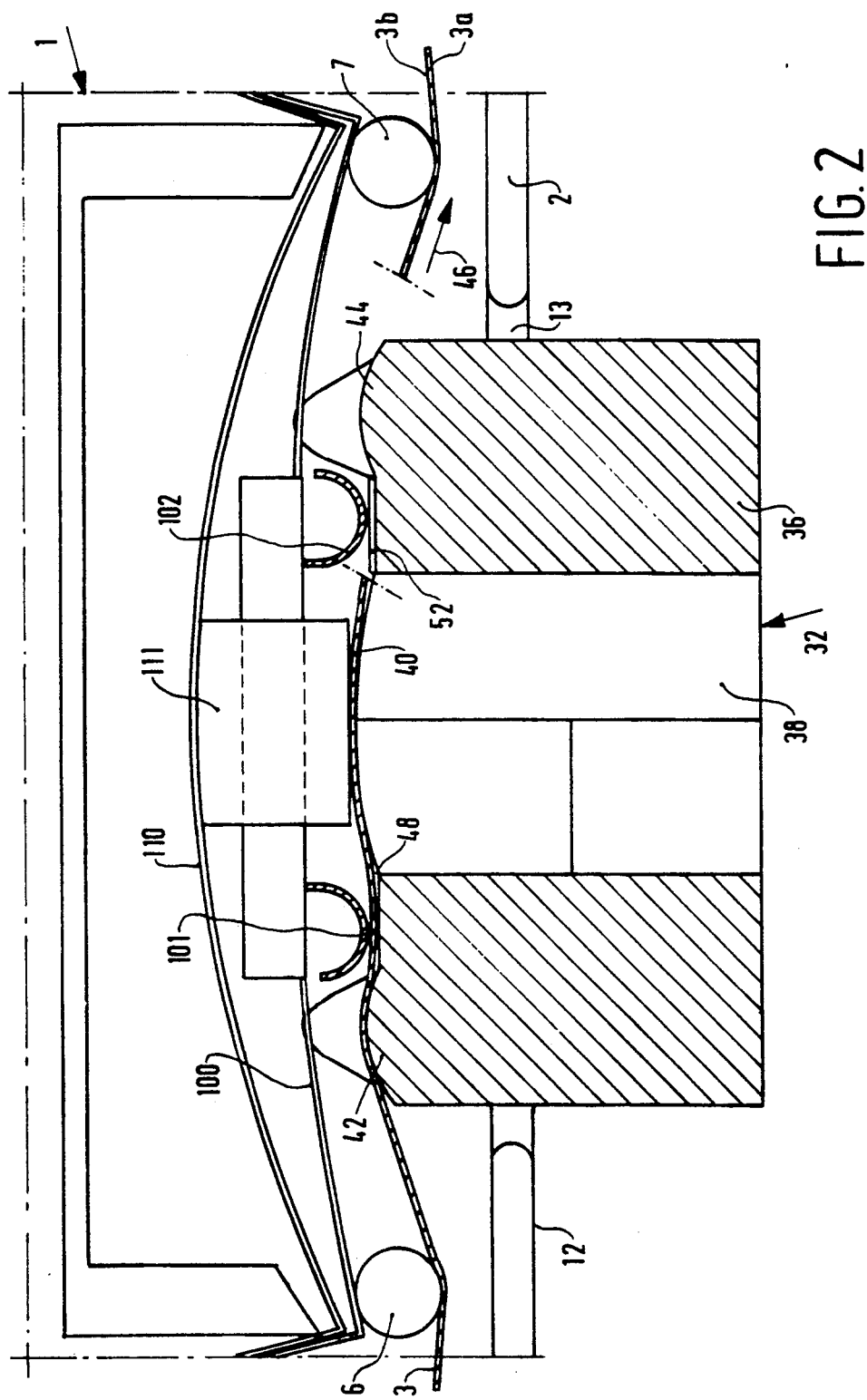
FIG. 2 is a sectional view of parts of the apparatus and of the cassette of FIG. 1 near the magnetic-head opening.

FIG. 2 illustrates in detail the cooperation between the cassette and the apparatus at the location of the magnetic-head unit. The magnetic-head unit 32 comprises a housing 36 accommodating a magnetic head 38 having a head face 40. The housing comprises two further tape guides 42 and 44, disposed at opposite sides of the head face 40 viewed in the tape-transport direction 46, which is the same as the longitudinal direction of the magnetic tape. Projections 48 and 52, with which the tape guides 101 and 102 are in contact, are situated between the further tape guides 42, 44 and the head face 40. These projections ensure that the magnetic tape 3 cannot become stuck between the tape guides 101 and 102 of the resilient element 100 and the magnetic-head unit 32 and that between the head-unit and the tape guides a clearance is formed through which the magnetic tape can be guided. Behind the resilient element 100, a further resilient element 110 is provided, which carries a pressure felt 111, which is in contact with the rear 3b of the magnetic tape, and which presses the magnetic tape with its coating side 3a against the head face 40 of the magnetic head 38 to improve the head-to-tape contact.

Figure 3:
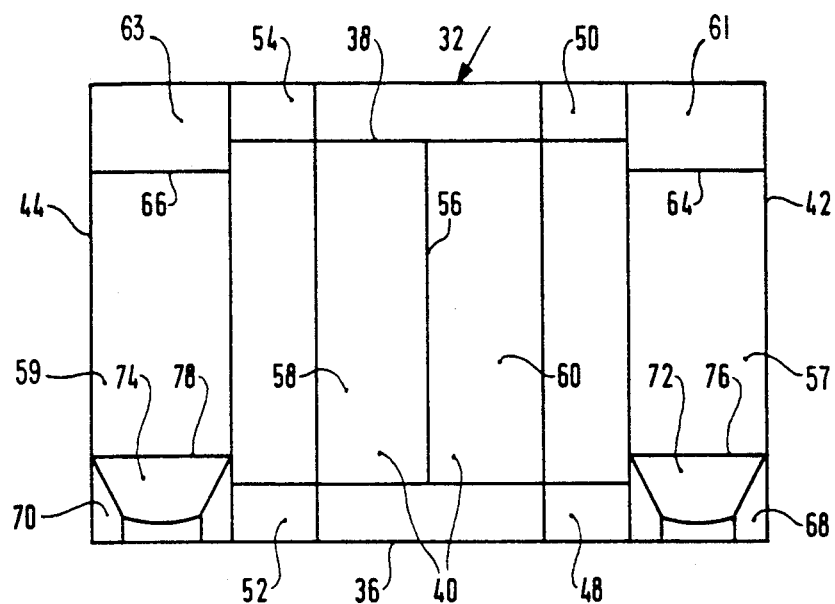
FIG. 3 is a view of a magnetic-head unit of the apparatus shown partly in FIG. 1.

FIG. 3 shows the magnetic-head unit 32 viewed at right angles to the head face 40. The transducing gaps of the magnetic head 38 are situated at the bounding line 56 between the two magnetic-head halves 58, 60. The further tape guides 42, 44, which form part of the housing 36, are situated at opposite sides of the head face 40. The further tape guides comprise further tape-guide surfaces 57, 59, height limiters 61, 63 and control elements 68, 70. The height limiters 61, 63 have limiting surfaces 64, 66 which extend perpendicularly to the further tape-guide surfaces and which are disposed in one plane perpendicular to the bounding line 56 with the transducing gaps. If an edge of the magnetic tape is in contact with the limiting surfaces, the angle between the transducing gaps and the tape edge is exactly 90 degrees, which is in compliance with international standards. To keep the tape edge in contact with the limiting surfaces, the magnetic tape is pressed against these limiting surfaces by the control elements 68, 70. For this purpose, the control elements comprise control surfaces 72, 74 which are inclined relative to the further tape-guide surfaces 57, 59. If the magnetic tape is guided by the control surfaces 72, 74 near its other edge, the inclination of these surfaces results in a force being exerted on the magnetic tape, directed towards the height limiters 60, 62. As a result of this, one edge of the magnetic tape is always in contact with the limiting surfaces 64, 66, and the angle between the transducing gaps and the tape edge is always correct. To achieve this, the distance between the limiting surfaces 64, 66 on the one hand, and the lines 76, 78 where the guide surfaces 57, 59 intersect the control surfaces 72, 74 on the other hand, should be smaller than or equal to the minimum width of the magnetic tape, which should be within the tolerance limits with which the magnetic tape must comply. The projections 48, 50, 52, 54 are situated between the further tape guides 57, 59 and the magnetic tape 38 and each comprise a flat surface which functions as a stop for the tape guides 101, 102 in the cassette 1.

Figure 4:
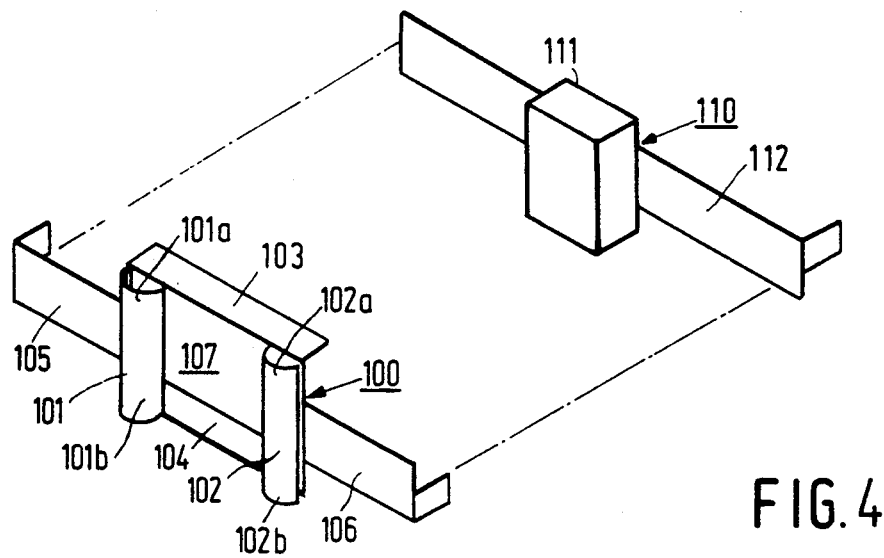
FIG. 4 is a view of a resilient element with tape guides of the cassette shown in FIG. 1, and of a further resilient element provided with a pressure felt.

FIG. 4 shows the resilient element 100 with the tape guides 101 and 102. The tape guides are interconnected by bridge portions 103, 104. An opening 107 is situated between the tape guides and the bridge portions to allow the passage of the pressure felt 111 arranged on the further resilient element 110. During cooperation of the cassette with the apparatus, blade springs 105, 106 and 112, secured to the tape guides and to the pressure felt, respectively, resiliently press the tape guides 101, 102 against the projections 48, 50, 52, 54, and the pressure felt 111 against the back of the magnetic tape 3 at the location of the head face 40. The tape guides 101, 102 then contact the projections only with their end portions 101a, 101b, 102a, 102b.

FIG. 5 again shows the resilient element 100 and the further resilient element 110, but now when situated in the cassette 1. For the sake of clarity, the cassette is shown without the magnetic tape. The resilient element 100 and the further resilient element 110 are disposed near the magnetic-head opening 13 in the front wall 12 of the cassette. Viewed from the front wall, element 110 is situated behind element 100, and the pressure felt 111 has such dimensions that it extends through the opening 107.

Figure 5:
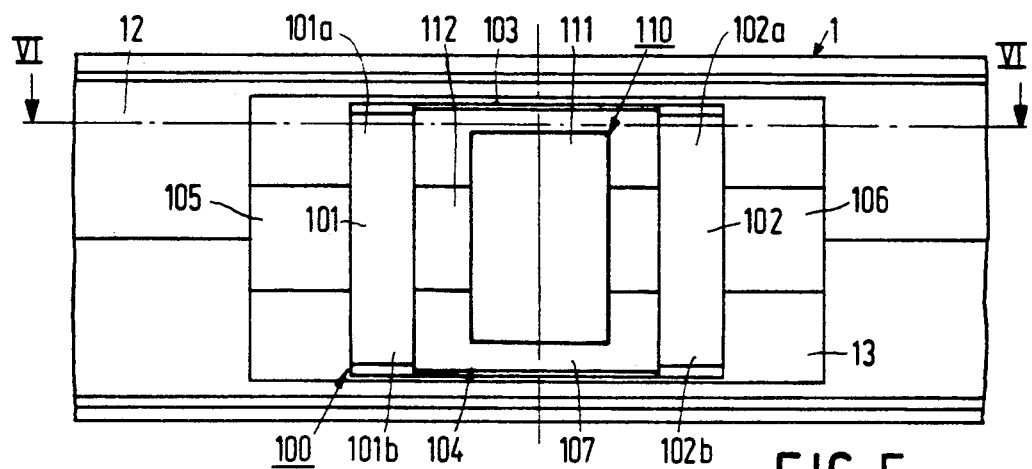
FIG. 5 is a front view of a part of the cassette shown in FIG. 1, without a magnetic tape in the cassette.
Figure 6:
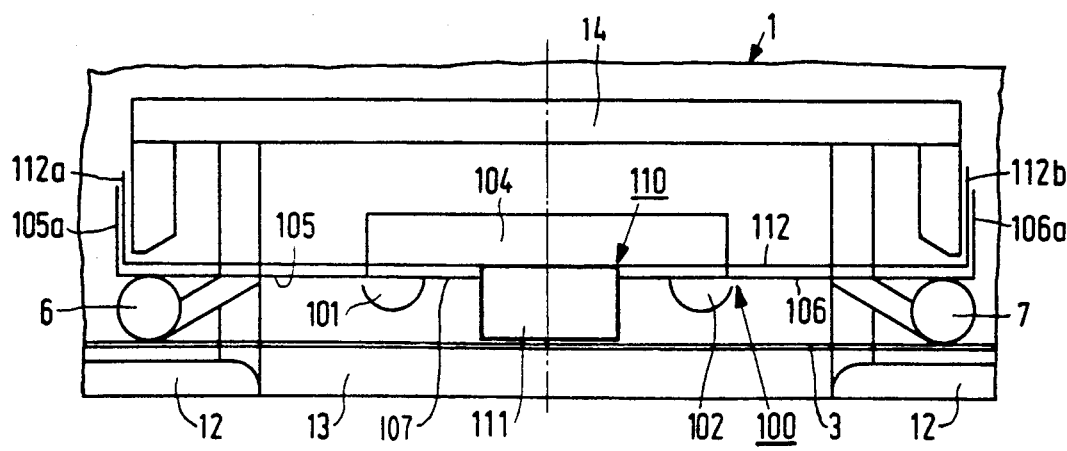
FIG. 6 is a sectional view of the part of the cassette shown in FIG. 5.

FIG. 6 is a sectional view of FIG. 5 along line VI—VI, and shows clearly that the pressure felt 111 extends through the opening 107 and that the magnetic tape 3 is not in contact with the tape guides 101 and 102 when the cassette 1 is outside the apparatus. At their free ends, the blade springs 105, 106 and 112 have bent portions 105a, 106a, 112a and 112b, so that the elements 100 and 110 are enclosed between the posts 6 and 7 and an intermediate wall 14.

Figure 7:
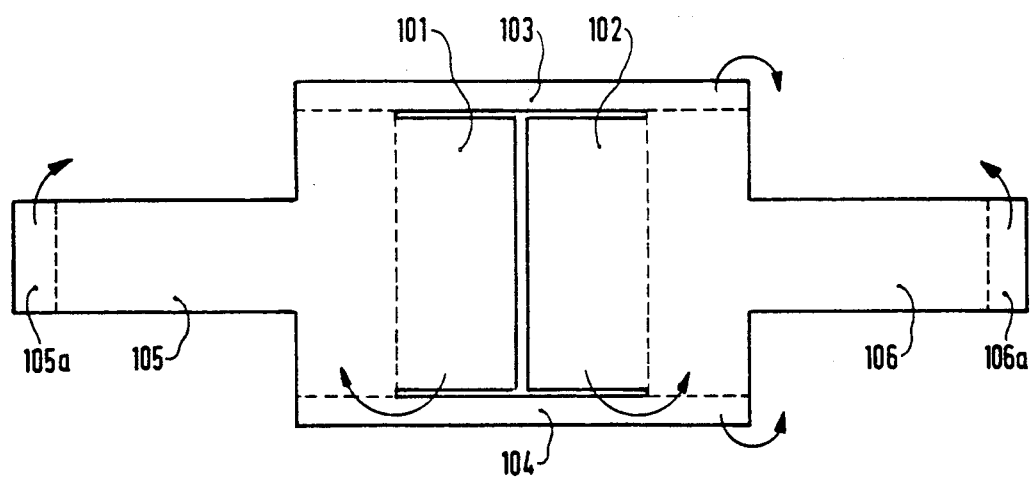
FIG. 7 shows a plate member from which the resilient element with the tape guides shown in FIG. 4 can be formed.

The resilient element 100 with the tape guides 101 and 102 can be bent from a single sheet member. FIG. 7 shows an example of a sheet member from which the resilient element can be bent. The broken lines are the lines along which portions 101, 102, 103, 104, 105a and 106a must be bent to form the element 100. The arrows indicate the directions in which the portions must be bent. It is evident that this construction enables the resilient element to be manufactured simply.

The invention is not limited to the particular embodiments of the system comprising the cassette and the apparatus shown herein. Other embodiments and variations of embodiments of the cassette, the resilient elements, the tape guides, the apparatus and the projections on the magnetic-head unit are also possible, and will be apparent to those skilled in the art. Accordingly, these other embodiments and variations are intended to be encompassed within the scope defined by the appended claims.

I claim:

1. A system comprising an apparatus and a cassette suitable for cooperation with the apparatus, which cassette comprises a magnetic tape with a coating on one side, and a housing having two parallel main walls and transverse walls including one front wall defining a magnetic-head opening, along which front wall the magnetic tape in the housing extends with its coating side facing the opening, which cassette further comprises a resilient element with two tape guides, which element is situated near the opening behind the magnetic tape in the cassette, which tape guides each comprise a guide surface guiding the magnetic tape during cooperation with the apparatus, which apparatus comprises a magnetic-head unit with a head face past which the magnetic tape is moved in its longitudinal direction during cooperation with the cassette, the magnetic tape coating being in contact with the head face, characterized in that the magnetic-head unit comprises two pairs of projections, one pair at each side of the head face, the projections of each pair spaced at a distance from one another which is at least equal to the width of the magnetic tape, the pairs being spaced from each other by a distance such that the projections are in contact with end portions of the cassette guide surfaces, whereby clearance is provided between the tape guides and the magnetic-head unit during cooperation with the apparatus.

2. A system as claimed in claim 1, in which the resilient element comprises two bridge portions interconnecting the tape guides, and two blade springs, each blade spring secured to one tape guide.

3. A system as claimed in claim 1, characterized in that each projection has a flat surface which during cooperation with the cassette is in contact with one of the end portions of one of the guide surfaces of one of the tape guides.

4. A cassette as claimed in claim 2, characterized in that the resilient element is constituted by one sheet member having bent portions.

5. The system of claim 1, in which the magnetic head unit comprises two further tape guides, one at each side of the projections.

* * * * *